United States Patent [19]
Kato et al.

[11] Patent Number: 5,504,569
[45] Date of Patent: Apr. 2, 1996

[54] DISTANCE-VELOCITY PREDICTING SYSTEM

[75] Inventors: Masahiko Kato; Hiroshi Matsuzaki; Tadashi Morokuma, all of Tokyo, Japan

[73] Assignee: Olympus Optical Co., Ltd., Tokyo, Japan

[21] Appl. No.: 156,629

[22] Filed: Nov. 24, 1993

[30] Foreign Application Priority Data

Nov. 24, 1992 [JP] Japan ................... 4-313488

[51] Int. Cl.⁶ ................ G01C 3/00; G01P 3/36; B60T 7/16
[52] U.S. Cl. .......... 356/3.11; 180/169; 342/104; 342/126; 367/89; 367/99; 356/3.09; 356/28
[58] Field of Search ................ 356/1, 28, 3.11, 356/3.09; 367/89, 99; 342/104, 126; 180/169

[56] References Cited

U.S. PATENT DOCUMENTS

| | | | |
|---|---|---|---|
| 3,633,010 | 1/1972 | Svetlichny | 356/1 |
| 3,690,767 | 9/1972 | Missio et al. | 356/1 |
| 3,781,111 | 12/1973 | Fletcher et al. | 356/5 |
| 4,911,548 | 3/1990 | Keren-Gill | 356/1 |
| 5,026,153 | 6/1991 | Suzuki et al. | 356/1 |
| 5,307,136 | 4/1994 | Saneyoshi | 356/1 |
| 5,317,517 | 5/1994 | Kawase et al. | 180/167 |

FOREIGN PATENT DOCUMENTS

| | | |
|---|---|---|
| 47-22532 | 6/1972 | Japan |
| 3-77746 | 4/1991 | Japan |
| 4-8531 | 1/1992 | Japan |

*Primary Examiner*—Stephen C. Buczinski
*Attorney, Agent, or Firm*—Cushman Darby & Cushman

[57] ABSTRACT

A distance-velocity predicting system has an illuminator for projecting a light beam for searching for an obstacle, and a plurality of position sensors spaced at a distance corresponding to a base line length. A minimum value of a distance component from the base line to an obstacle lying in a direction perpendicular to the base line, which is obtained from the light beam and the position sensors, or a value in the neighborhood of the minimum value, is sampled to obtain time-series data, and a relative velocity component in a direction perpendicular to the base line with respect to the obstacle is obtained in real time by using the time-series data. The relative velocity component perpendicular to the base line is compared with a predetermined threshold value, and when the relative velocity component exceeds the threshold value, a starting signal for life protecting equipment is generated.

16 Claims, 16 Drawing Sheets

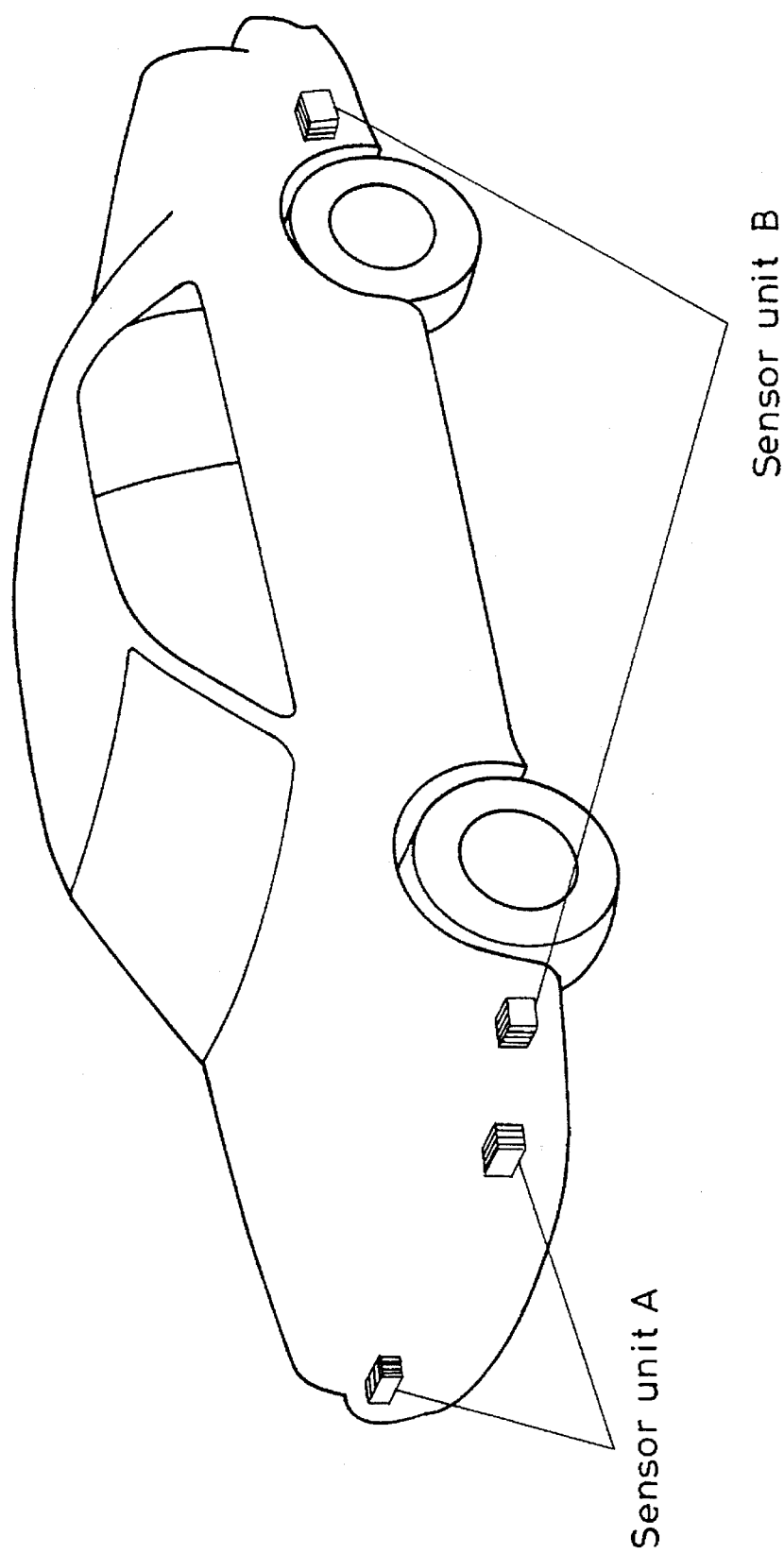

DISTANCE-VELOCITY PREDICTING SYSTEM

BACKGROUND OF THE INVENTION

The present invention relates to a distance-velocity predicting system which is suitably used for an automobile collision predicting sensor, for example. More particularly, the present invention relates to a distance-velocity predicting system adapted to detect a danger of collision and a relative velocity immediately before a collision occurs and to generate a starting signal for life protecting equipment.

As an automobile collision predicting sensor, a back sensor has heretofore been known, which is adapted for preventing a rear-end collision at the time of traffic congestion and for preventing a collision when the car is backed up. In general, whether or not a collision is dangerous to the driver or other occupant's life depends on the relative velocity with respect to an obstacle concerned, the weight of the obstacle, the way in which the collision occurs, etc., and in many cases it is difficult to predict these things before the occurrence of a collision. As a conventional method of measuring the intensity of impact of a collision after it has occurred, a mechanical deceleration sensor is known. With the mechanical deceleration sensor, when the measured deceleration exceeds a certain threshold value, life protecting equipment, e.g., an air bag, a pretensioner, etc., is activated to relieve the impact of the collision.

Hitherto, a great variety of methods of predicting a danger of collision have been proposed. Most of the conventional predicting methods are based on the assumption that the distance between two cars concerned is relatively long, as is seen in the rear-end collision preventing system. However, it plays an important part in determining whether to activate the life protecting equipment to detect a danger of collision between a moving object and an obstacle and a relative velocity between them in a state where the moving object and the obstacle are in close proximity to each other before they come into collision.

As a conventional distance-velocity measuring method which also takes into consideration a state where the moving object and the obstacle are in close proximity to each other, a method based on triangulation is known. One example of the distance measuring method by triangulation is shown in FIG. 1. The line segment AB represents a base line length. Distance sensors are provided at the two ends A and B, respectively, of the line segment. The point P represents an obstacle. With coordinate axes taken as illustrated in the figure, the coordinates of the point P are assumed to be (X,Y). The two-dimensional position (X,Y) of the point P canbe obtained, for example, by measuring the angles $\Theta$ and $\phi$ at the two ends of the base line AB, which is used as a reference, or by measuring the lengths of two sides BP and AP.

Distance sensors used for triangulation may be divided into two types: active and passive. The active type is adapted, for example, to emit a light beam from either or each of the points A and B to illuminate the obstacle P. Known techniques of the active type include: one in which a difference in the time required for light to reach and return from the obstacle is measured by using pulsed light; another in which the time difference is converted into a phase difference between amplitude-modulated waves to thereby measure the position of the point P; and another in which the position of a point image of the obstacle P illuminated is measured with an imaging device, e.g., a CCD, a PSD, etc.

The present applicant has already proposed one example of the passive type sensor as Japanese Patent Application No. 03-77746 (1991). The proposed technique will be roughly explained below with reference to FIGS. 2 and 3. Referring to FIG. 2, passive sensor units $O_1$—$C_1$, $O_2$—$C_2$, $O_3$—$C_3$, and $O_4$—$C_4$ show an arrangement for distance measurement. A pair of passive sensor units $O_1$—$C_1$ and $O_2$—$C_2$ are spaced at a relatively short distance $L_1$, as are another pair of passive sensor units $O_3$—$C_3$ and $O_4$—$C_4$. These two pairs of passive sensor units are spaced at a relatively long distance $L_2$ from one another. Let us assume that a point P on an obstacle is at a distance R from the sensor surface 1 and at a distance S from the sensor center line 3. Fixed focus lenses $O_1$, $O_2$, $O_3$ and $O_4$ are disposed on the sensor surface 1, and imaging devices (not shown) are disposed at respective positions on the imaging surface 2 near the focal points of the fixed focus lenses associated therewith. Images of the point P that are formed by the fixed focus lenses $O_1$, $O_2$, $O_3$ and $O_4$ are assumed to be $C_1$, $C_2$, $C_3$ and $C_4$, respectively. $C_iQ_i$ (i=1 to 4) represents a transverse displacement of the image measured with reference to an image position $C_i$ (i=1 to 4) when the point P is at infinity. Assuming that the transverse displacement of the image is $x_i$ (i=1 to 4), the two-dimensional distances R and S may be expressed as follows:

$$R=fL_2/f\{(x_1+x_2)/2-(x_3+x_4)/2\} \qquad (1)$$

$$S=-R\cdot(x_1+x_2+x_3+x_4)/(4f)$$

where f is the focal length of each fixed focus lens, and $L_2$ is the longer base line length.

The transverse displacement $x_i$ (i=1 to 4) is determined by executing feature extraction from a correlation between the imaging devices spaced at the shorter base line length $L_1$. It is possible according to the equation (1) to carry out distance measurement of high accuracy based on the longer base line length $L_2$ in a short time by using correlation processing based on the shorter base line length $L_1$.

Regarding the danger of collision, the measuring range is divided into a plurality of regions according to the degree of danger of collision on the basis of the sign of the transverse displacement and the measured distance and displayed as shown in FIG. 3. In FIG. 3, since the shorter base line length $L_1$ is sufficiently shorter than the longer base line length $L_2$, it is ignored. Therefore, $O_1$ and $O_2$ are regarded as the same point and displayed accordingly, as are $O_3$ and $O_4$. In addition, reference numeral 4 denotes a car, and 5 a sensor surface. Reference numerals 6 and 7 denote boundary lines. The region I is the most dangerous region. The regions II and III are lower in the degree of danger than the region I. Symbols A, B and C denote ranks of the degree of danger according to the distance. Symbol A represents the most dangerous region. In addition, $R_a$ denotes a range which is covered by active sensors annexed to the passive sensor units. $R_r$ denotes a monitoring range.

To obtain a velocity on the basis of distance measurement by triangulation, it is computed indirectly from time-series data on distance. As one example of direct measurement of a danger of collision by triangulation, the arrangement of Japanese Patent Application Post-Exam Publication No. 47-22532 (1972) is shown in FIG. 4. In the figure, reference numeral 4 denotes a moving object, e.g., a car, which is provided with Doppler sensors $A_L$ and $A_R$. Reference symbol P denotes an obstacle including another car, V a relative velocity between the obstacle P and the moving object 4, and $\Theta_L$ and $\Theta_R$ are angles made between the velocity vector V on the one hand and $PA_L$ and $PA_R$ on the other. The Doppler sensors $A_L$ and $A_R$ are adapted to emit a microwave and subject the reflected wave from the obstacle to heterodyne detection to thereby detect a Doppler shift. Doppler shifts corresponding to $V \cos\Theta_L$ and $V \cos\Theta_R$ are detected by the Doppler sensors $A_L$ and $A_R$, respectively. It is stated in Japanese Patent Application Post-Exam Publication No. 47-22532 (1972) that when the ratio between the two Doppler shifts ($\cos\Theta_L/\cos\Theta_R$) is within a predetermined range, the degree of danger of the moving object 4 and the obstacle P colliding with each other is high.

In addition, the present applicant has already proposed in the collision predicting system disclosed in Japanese Patent Application No. 04-8531 (1992) a method of obtaining an evaluation quantity concerning the danger of collision and a velocity immediately before a collision occurs. The principle of this method is illustrated in FIG. 5. Let us assume that P is an obstacle, and Q and R are distance-velocity measuring devices which are provided at both ends, respectively, of a moving object. V is a relative velocity between the moving object and the obstacle. $V_1$ and $V_2$ are velocity components in the directions of the distance-velocity measuring devices Q and R. $\Theta$ is an angle made at the point P between the line segments PQ and PR. $\Theta_1$ is the angle made between V and $V_1$. L is the length of the base line QR. The distances from Q and R to the point P are assumed to be $L_1$ and $L_2$, respectively. The degree of danger of collision is high when $\Theta_1 \leq \Theta$, and it lowers according to the extent of $\Theta_1 > \Theta$, which may be expressed as follow:

$$|k| \leq \tan^2(\Theta/2) \qquad (2)$$

where $\Theta = \cos^{-1}(L_1^2 + L_2^2 - L^2)/2L_1L_2$
$K = (V_2 - V_1)/(V_1 + V_1)$
True relative velocity V is given by $$V = (V_1^2 + V_2^2 - 2V_1V_2 \cos\Theta)^{1/2}/\sin\Theta \qquad (3)$$

When the relative velocity V exceeds a certain set value $V_{th}$, life protecting equipment is activated.

The prior art suffers, however, from the following disadvantages:

In the case of active distance measurement by triangulation, the detection of a velocity with respect to an obstacle having magnitude involves difficulties stated below:

Referring to FIG. 6, let us assume that two points A and B are apart from each other by a distance corresponding to the base line length, and a distance sensor is disposed at the point A, while a pair of a light-sending unit and a distance sensor are disposed at the point B, and that a light beam $BP_1$ is emitted from the light-sending unit, and it intersects an obstacle 8 at a point $P_1$ at time $T_1$. The two-dimensional position of the point $P_1$ at this time is detected by the photosensors for position detection disposed at the points A and B. At time $T_2$, the obstacle has moved to a position shown by reference numeral 9. The displacement vector is represented by the arrow $P_1P_2$, where $P_2$ represents the position of $P_1$ at time $T_2$. However, the point that is detected by the light beam $BP_1$ moves on the obstacle to $P_2'$, not $P_2$. Therefore, the apparent displacement vector is such as that shown by the arrow $P_1P_2'$. Accordingly, the displacement vector observed is different from the actual displacement vector $P_1P_2$ in both magnitude and direction. In other words, an obstacle having of significant size involves a possibility that an erroneous displacement vector may be detected because the point illuminated by the light beam moves on the obstacle. Therefore, there is a likelihood that an accurate velocity will not be detected.

In Japanese Patent Application No. 03-77746 (1991) that uses active triangulation in combination with passive triangulation, a feature point on an obstacle is obtained by passive correlation processing, and a transverse displacement corresponding to the parallax is detected for the feature point. Therefore, there is no likelihood that the above-described erroneous detection will occur. However, in the present state of the art, the proposed method takes time and is therefore inconvenient in a case where a judgment must be made in a short time just before a collision occurs. Further, in the active measurement, no consideration is given to the detection of a velocity with respect to an obstacle having significant size.

In Japanese Patent Application Post-Exam Publication No. 47-22532 (1972), the ratio between two Doppler shifts ($\cos\Theta_L/\cos\Theta_R$) is a function of the distance between the moving object and the obstacle. Accordingly, different set values must be used for different distances, which is inconvenient. In Japanese Patent Application No. 04-8531 (1992), two different kinds of measuring devices are needed for the measurement of distance and velocity, and hence the arrangement is complicated and costly.

SUMMARY OF THE INVENTION

It is an object of the present invention to measure a distance and a velocity in a short time and at a high degree of accuracy with a simple arrangement that requires only a distance measuring device.

It is another object of the present invention to enable a starting signal for life protecting equipment to be generated by evaluating the degree of danger of collision from the distance and velocity measured.

The present invention provides a distance-velocity predicting system including an illuminator for projecting a light beam for searching for an obstacle, and a plurality of position sensors spaced at a distance corresponding to a base line length. The distance-velocity predicting system further includes a device for sampling a minimum value of a distance component from the base line to an obstacle lying in a direction perpendicular to the base line, which is obtained from the position sensors by receiving light reflected or scattered by the obstacle illuminated with the light beam, or a value in the neighborhood of the minimum value, and for measuring a time at which the value is sampled, and a device for obtaining a relative velocity component in a direction perpendicular to the base line with respect to the obstacle from time-series data on the sampled value.

In addition, the present invention provides a distance-velocity predicting system including an illuminator for projecting a light beam for searching for an obstacle, and a plurality of position sensors spaced at a distance corresponding to a base line length. The distance-velocity predicting system further includes a device for sampling a minimum value of a distance component from the base line to an obstacle lying in a direction perpendicular to the base line, which is obtained from the position sensors by receiving light reflected or scattered by the obstacle illuminated with the light beam, or a value in the neighborhood of the minimum value, and for measuring a time at which the value is sampled, and a device for obtaining a relative velocity component in a direction perpendicular to the base line with respect to the obstacle from time-series data on the sampled value. In addition, the distance-velocity predicting system includes a device for comparing the relative velocity component with a predetermined threshold value and for generating a starting signal for life protecting equipment when the relative velocity component exceeds the threshold value.

The illuminator for projecting a light beam for searching for an obstacle may have a plurality of light-emitting elements or an array of light-emitting elements, which are arranged in the vicinity of a focal point of a projection lens.

The illuminator may be adapted to emit at least two light beams from each end of the base line so that the light beams from the two ends of the base line intersect each other.

The distance-velocity predicting system may further include a device for detecting the fact that the obstacle has come closer to the base line than a point which is at a predetermined distance from the base line, and a device for forming a signal for changing over the light beams on the basis of an output signal from the detecting device.

The distance-velocity predicting system may further include a device for distinguishing a degree of danger of collision and a direction of movement in which the degree of danger of collision is high from a two-dimensional distance signal obtained from the position sensors.

The distance-velocity predicting system may further include a device for outputting a signal indicating a danger of collision when the following condition holds between changes $\Delta x1$ and $\Delta x2$ of displacements $x1$ and $x2$ on imaging devices of the position sensors:

$$\Delta x1 \cdot \Delta x2 \leq 0$$

BRIEF DESCRIPTION OF THE DRAWINGS

FIG. 21 shows one example in which the distance-velocity predicting system of the present invention is attached to an automobile.

DESCRIPTION OF THE PREFERRED EMBODIMENTS

Figure 1:
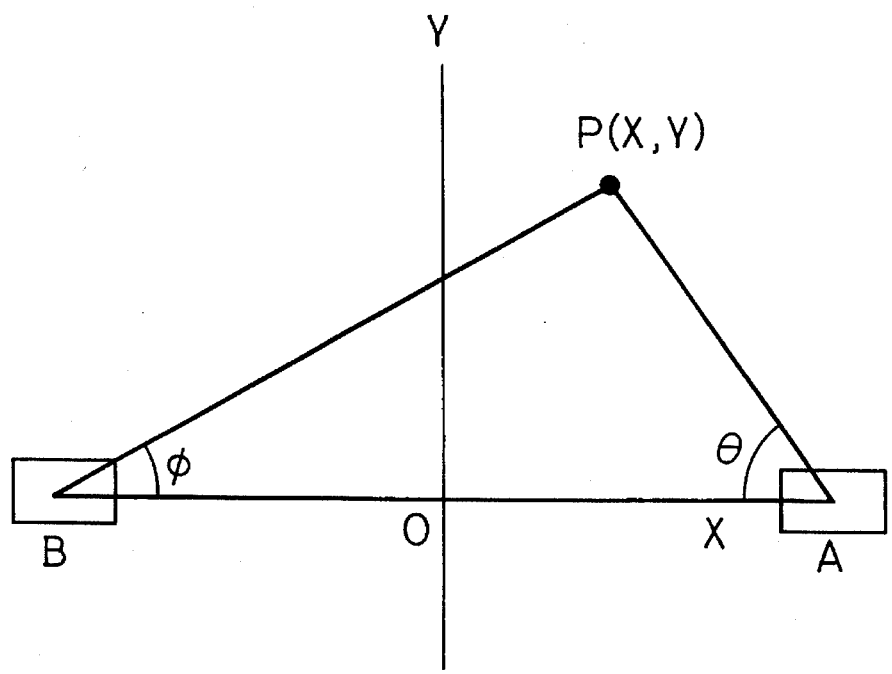
FIG. 1 illustrates a distance-velocity measuring method based on triangulation.
Figure 2:
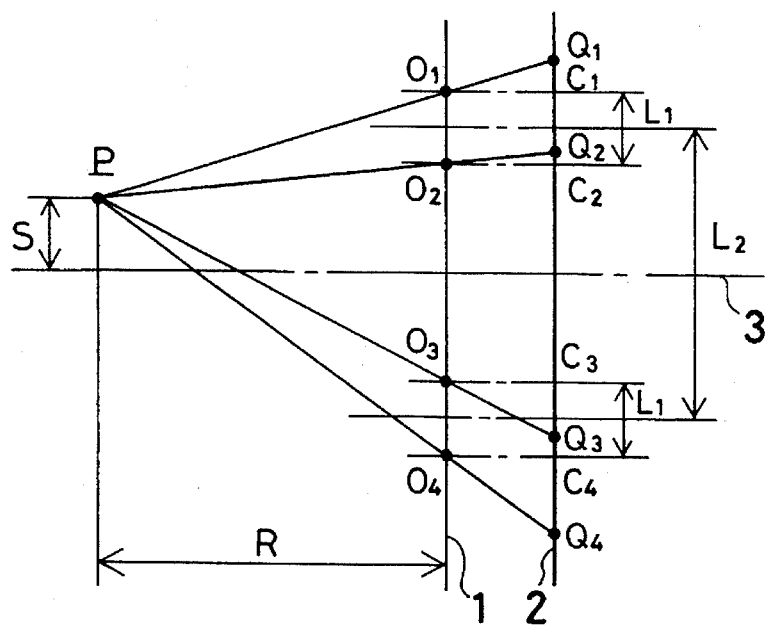
FIG. 2 illustrates a distance-velocity measuring method that employs passive sensor units.
Figure 3:
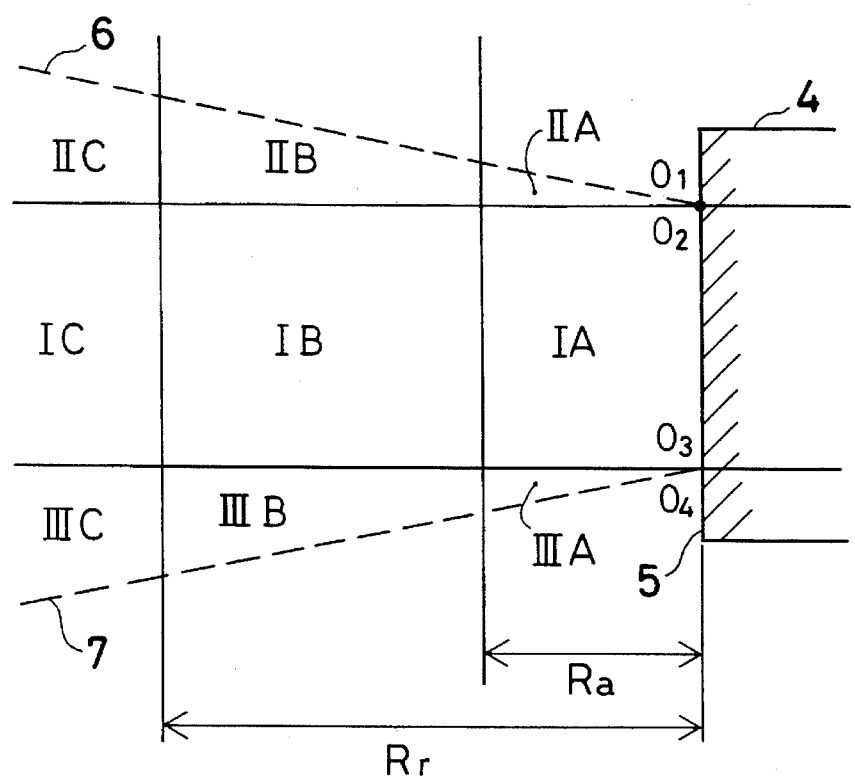
FIG. 3 illustrates the distance-velocity measuring method that employs passive sensor units.
Figure 4:
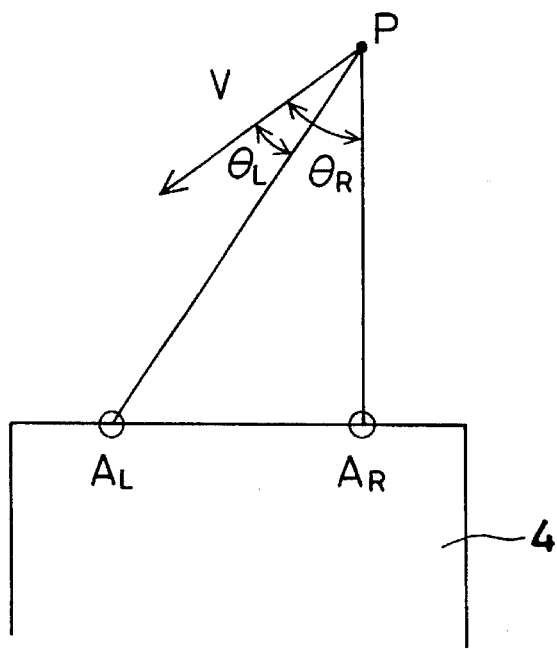
FIG. 4 illustrates a method of obtaining a velocity on the basis of distance measurement by triangulation.
Figure 5:
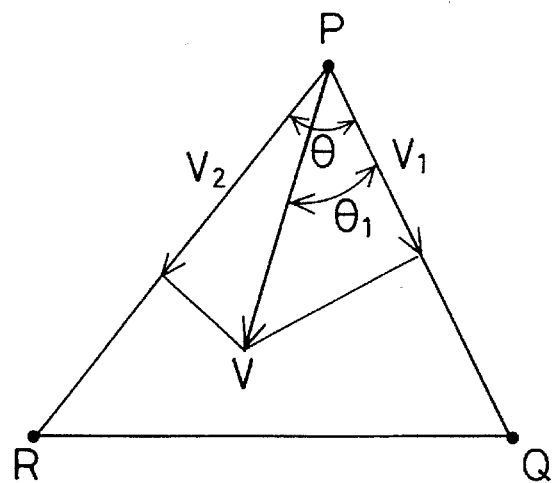
FIG. 5 illustrates a method of obtaining an evaluation quantity concerning the danger of collision and a velocity immediately before a collision occurs.
Figure 6:
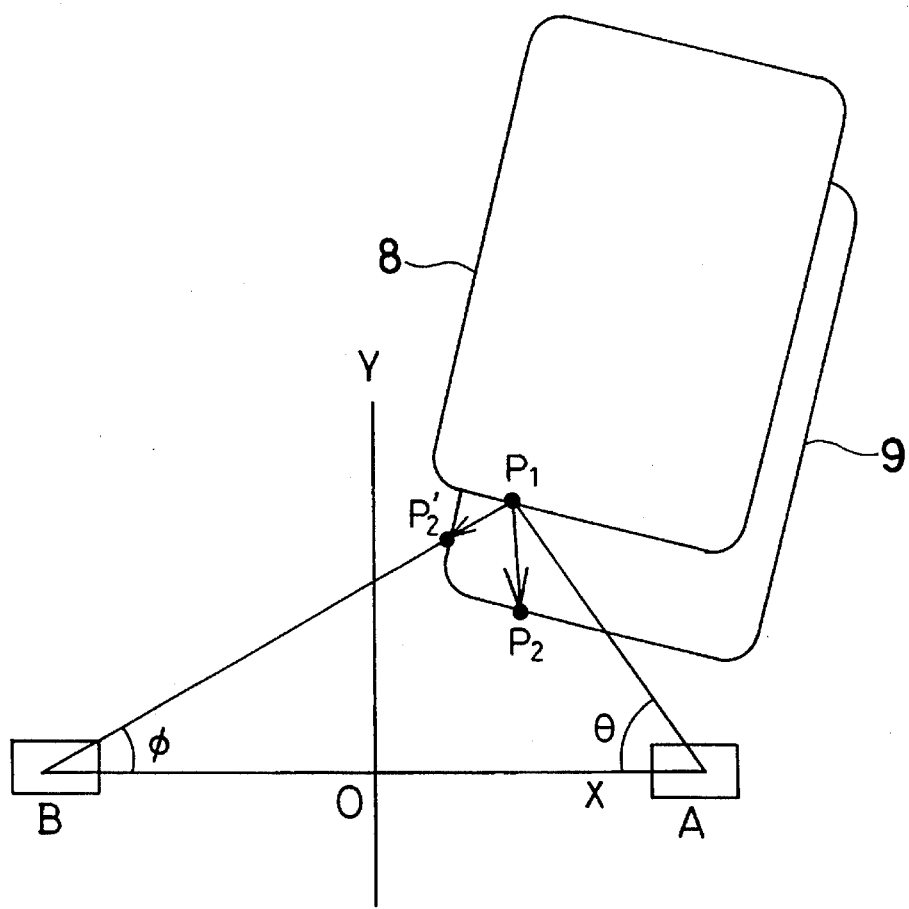
FIG. 6 illustrates detection of a velocity with respect to a large obstacle by triangulation.
Figure 7:
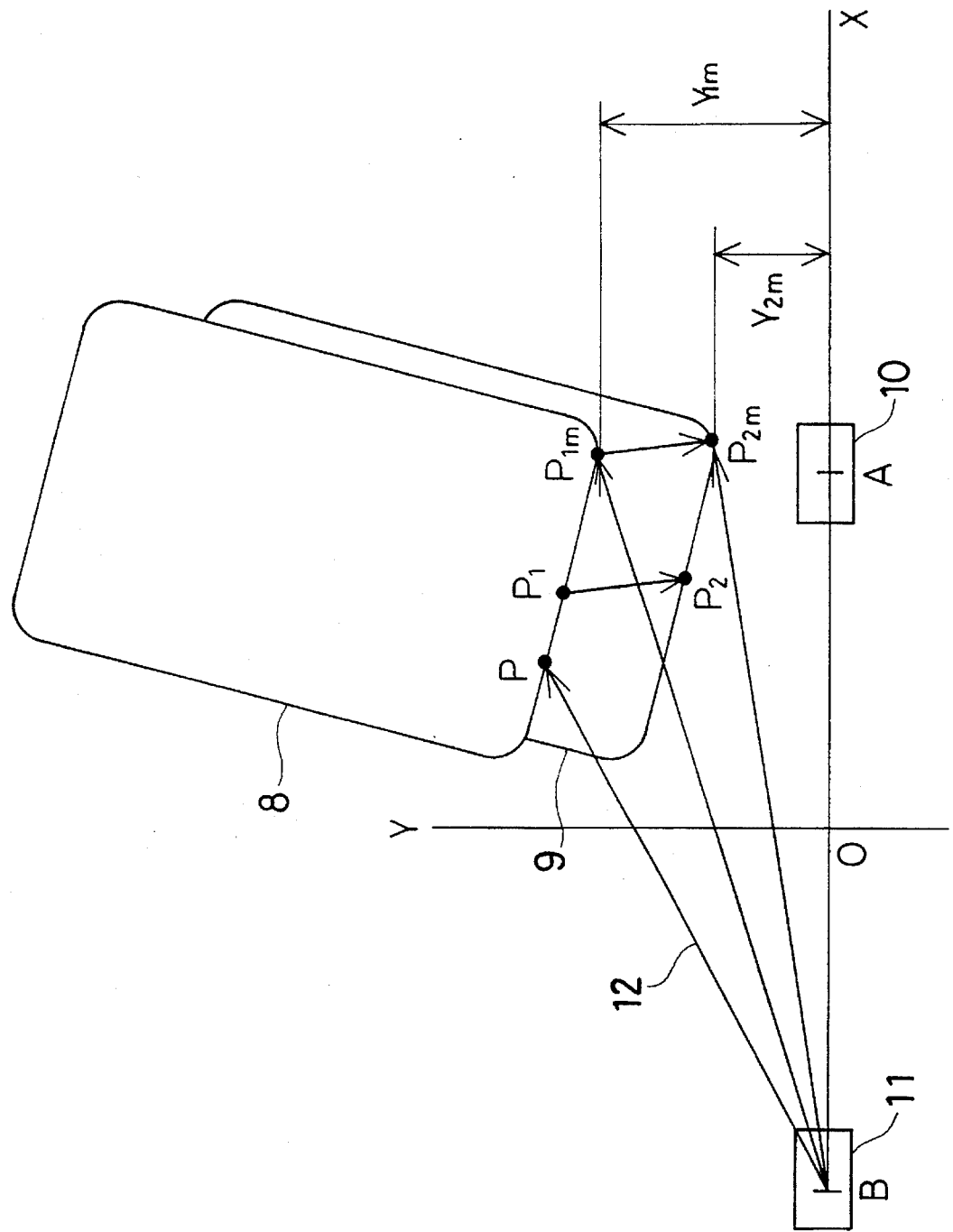
FIG. 7 illustrates the principle of the present invention.
Figure 8:
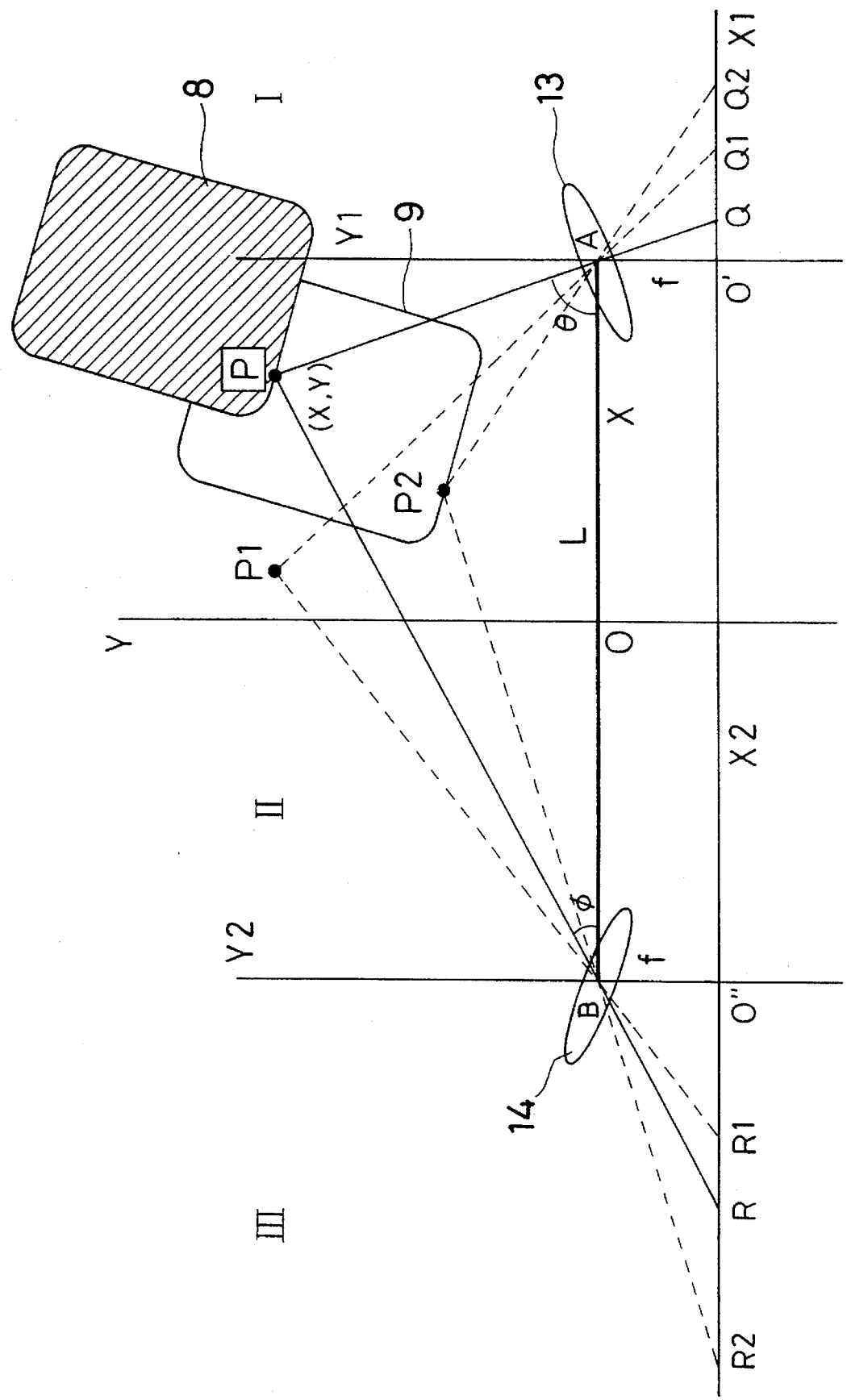
FIG. 8 illustrates the principle of the present invention.

FIGS. 7 and 8 are conceptual views showing the principle of the present invention. Referring to FIG. 7, the line segment AB represents a base line, and reference numeral 8 denotes an obstacle. Active distance sensors 10 and 11 are disposed at two points A and B, respectively. With the middle point on the base line AB defined as the origin O of a coordinate system, X- and Y-axes are set, as shown in the figure. An arbitrary point on the obstacle 8 is assumed to be P. The two-dimensional position of the point P is measured by the distance sensors 10 and 11, and the result of the measurement is assumed to be (X,Y). Let us assume that the obstacle moves relative to the base line AB from the position 8 to the position 9. Taking note of a specific point $P_1$ on the obstacle, if the position of the point $P_1$ when the obstacle 8 has moved to the position 9 is represented by the point $P_2$, the vector $P_1P_2$ expresses the true displacement vector of the obstacle 8. When an arbitrary point on the obstacle is measured with the active distance sensors 10 and 11 using a light beam 12, no true displacement vector can be measured because of the above-described difficulty in measuring a large obstacle. However, if the point on the obstacle 8 that is the closest to the base line AB is represented by $P_{1m}$, this point is uniquely determined on the obstacle. Therefore, if it is assumed that the position of the point $P_{1m}$ when the obstacle has moved to the position 9 is represented by $P_{2m}$, the point $P_{2m}$ is the point on the obstacle that is the closest to the base line AB. In other words, the points $P_{1m}$ and $P_{2m}$ are points of contact with lines which are tangent to the obstacles 8 and 9 and which are parallel to the base line. In this case, however, it is assumed that the movement of the obstacle 8 relative to the base line AB is approximately parallel displacement in a region close to the base line AB. On the above assumption, the vector $P_{1m}P_{2m}$ is coincident with the true displacement vector $P_1P_2$ of the obstacle.

Next, a method of obtaining the two-dimensional coordinates (X,Y) of the illuminated point P on the obstacle 8 and a danger of collision will be explained with reference to FIG. 8. The angles made between the base line AB on the one hand and the line segments PA and PB are represented by $\theta$ and $\phi$, respectively. In addition, for the end point A of the base line, coordinate axes X1 and Y1 are taken with the origin set at O', and for the end point B of the base line, coordinate axes X2 and Y2 are taken with the origin set at O", as shown in the figure. The positive direction of the axes X1 and X2 is taken in the rightward direction. Lenses 13 and 14 are disposed at the two ends A and B, respectively, of the base line AB. Images of the point P are formed by the lenses 13 and 14 at Q and R on the respective focal surfaces. O'Q=x1, and O"R=x2. In the case of FIG. 8, O'Q≧0, and O"R≦0. The two-dimensional position (X,Y) of the point P is grasped by the image positions x1 and x2 on the imaging devices. X and Y are obtained as follows:

$$X = (L/2)(\tan\theta - \tan\phi)/(\tan\theta - \tan\phi) \quad (4)$$
$$= (L/2)(O"R + O'Q)/(O"R - O'Q)$$

-continued $$Y = L\tan\theta\tan\phi/(\tan\theta + \tan\phi) \quad (5)$$
$$= Lf/(O'Q - O''R)$$

where $\tan\Theta = f/O'Q$, $\tan\phi = -(f/O''R)$
f: the focal length of the lens It will be understood from the equation (5) that Y and the Y-direction component $V_y$ of the relative velocity with respect to the obstacle can be basically obtained from O"R—O'Q and time-series data thereon. The relation between $x_1$ and $x_2$ on the one hand and $\beta$ and $\phi$ on the other may be expressed under a proper agreement about the sign as follows:

$$x1 = f\cot\Theta, \quad x2 = -f\cot\phi \quad (6)$$

Next, let us consider a possibility or danger of collision. In this case, we will consider a collision which may occur in the interval AB. For the sake of convenience, the monitoring range is divided into regions I to III, as shown in FIG. 8. That is, I is the region on the right side of Y1, II is the region intermediate between Y1 and Y2, and III is the region on the left side of Y2. The regions I and III are lower in the degree of danger of collision than the region II. A region in which the point P is present can be recognized from Table 1 below according to the sign of x1 and x2.

TABLE 1

|    | I        | II       | III      |
|----|----------|----------|----------|
| x1 | negative | positive | positive |
| x2 | negative | negative | positive |

It will be understood from Table 1 that when $x1 \cdot x2 \leq 0$, the point P is in the region II.

Next, the movement of the point P will be considered. Let us take two points $P_1$ and $P_2$ outside and inside the triangle APB. Of two movements expressed by displacement vectors PP1 and PP2, PP2 may be said to be movement higher in the degree of danger of collision than PP1. The directions of movement PP1 and PP2 can be distinguished from Table 2 below.

TABLE 2

| PP1 | | PP2 | |
|---|---|---|---|
| $\Delta x1 = QQ1$ | positive | $\Delta x1 = QQ2$ | positive |
| $\Delta x2 = RR1$ | positive | $\Delta x2 = RR2$ | negative |

It will be understood from Table 2 that $\Delta\Delta 1 \cdot \Delta x2 \leq 0$ can be used as a criterion for judgment of a direction of dangerous movement.

A first embodiment of the present invention is shown in FIGS. 9 to 14.

Figure 9:
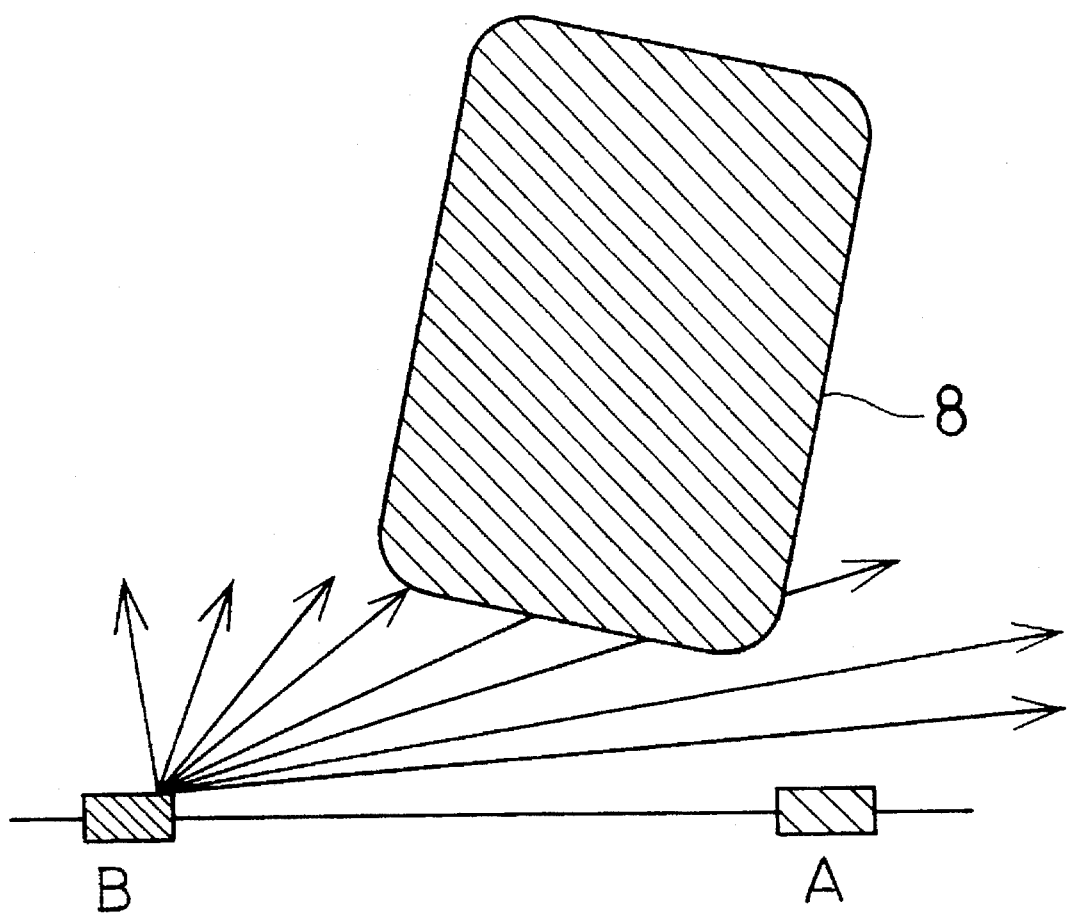
FIG. 9 is a conceptual view of a first embodiment of the present invention.

The concept of this embodiment will be explained below with reference to FIG. 9. In the figure, an obstacle is denoted by reference numeral 8. A light-receiving unit is provided at a point A, and a pair of light-sending and -receiving units are provided at a point B. Light beams are radially emitted from the light-sending unit at the point B. By sequentially flashing these light beams, the space where the obstacle 8 is present is practically scanned with a rotating light beam to search for a point on the obstacle 8 that is the closest to the base line AB.

Figure 10:
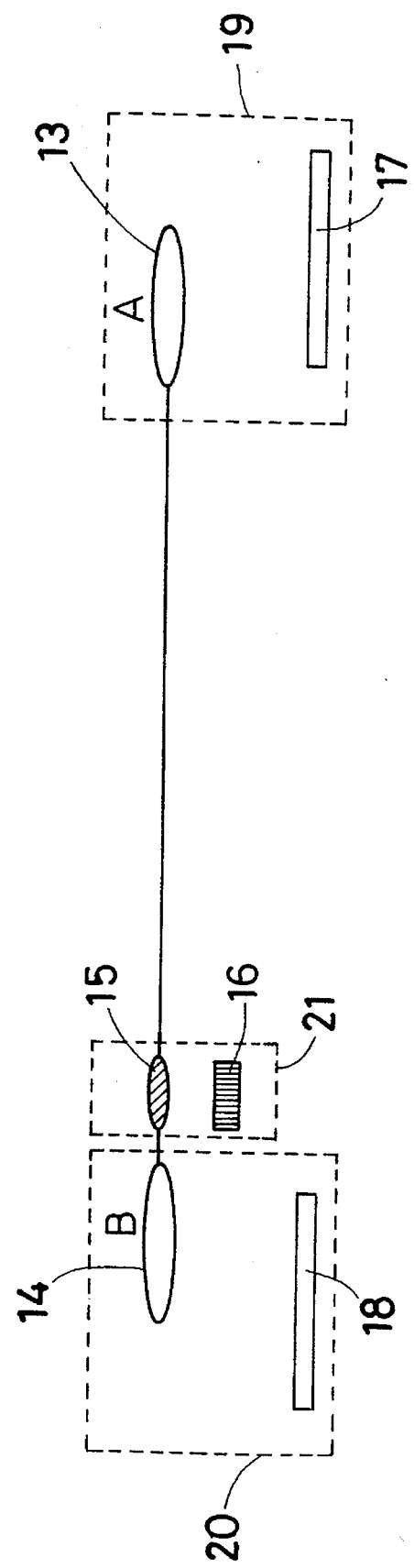
FIG. 10 shows a specific arrangement of an optical system in the first embodiment.

A specific arrangement of an optical system in this embodiment will be explained below with reference to FIG. 10. The optical system has a light-receiving unit 19 provided at one end A of the base line AB and a pair of light-receiving and -sending units 20 and 21 at the other end B. The light-sending unit 21 is disposed in close proximity to the light-receiving unit 20. The light-sending unit 21 is composed of a lens 15 and a plurality of light sources 16 arranged in the vicinity of the focal point of the lens 15. The light-receiving units 19 and 20 are respectively composed of lenses 13 and 14 and position-sensitive imaging devices 17 and 18, e.g., PSDs or CCDs. The lenses 13 and 14 in the two light-receiving units are disposed on the same plane, and the imaging devices 17 and 18 are each disposed on a plane which is parallel to the above-described plane and away from it by a distance corresponding to the focal length of the lens associated therewith. As the light sources 16, laser diodes or light-emitting diodes are employed. As the base line length AB, a relatively long distance, e.g., about 1 m to 2 m, is employed.

Next, the function of the optical system will be explained. Light from the light sources 16 is collimated by the lens 15 to illuminate an obstacle (not shown). Point images of the obstacle are formed on the imaging devices 17 and 18 by the lenses 13 and 14 in the light-receiving units 19 and 20 provided at the two ends of the base line AB. The plurality of light sources 16 are turned on in turn in a time-series manner. Thus, collimated light emitted from the light-sending unit 21 rotates about the point B to scan the space where the obstacle is present, as shown in FIG. 9.

Next, a method of searching for a point on the obstacle 8 that is the closest to the base line AB will be explained with reference to the block diagram of FIG. 11.

Figure 11:
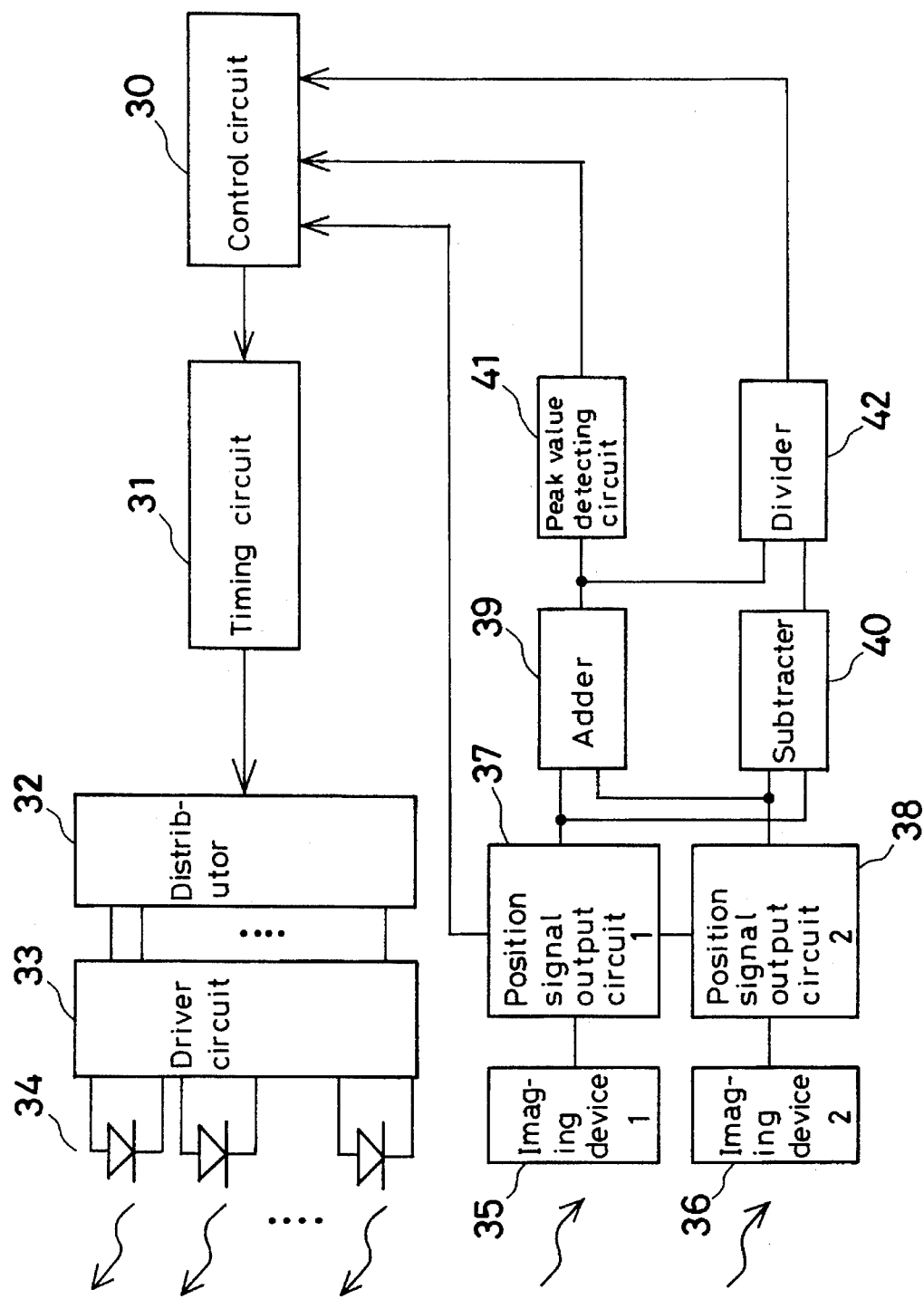
FIG. 11 is a block diagram showing the arrangement of a signal processing system in the first embodiment.

As shown in FIG. 11, a signal processing system used to carry out the above method includes a light-sending system and a light-receiving system. The light-sending system has a control circuit 30, a timing circuit 31, a distributor 32, a driver circuit 33, and light sources 34. The light-receiving system has imaging devices 35 and 36, position signal output circuits 37 and 38, an adder 39 for adding together outputs of the position signal output circuits 37 and 38, a subtracter 40 for calculating the difference between the outputs of the position signal output circuits 37 and 38, a peak value detecting circuit 41, and a divider 42.

Figure 12:
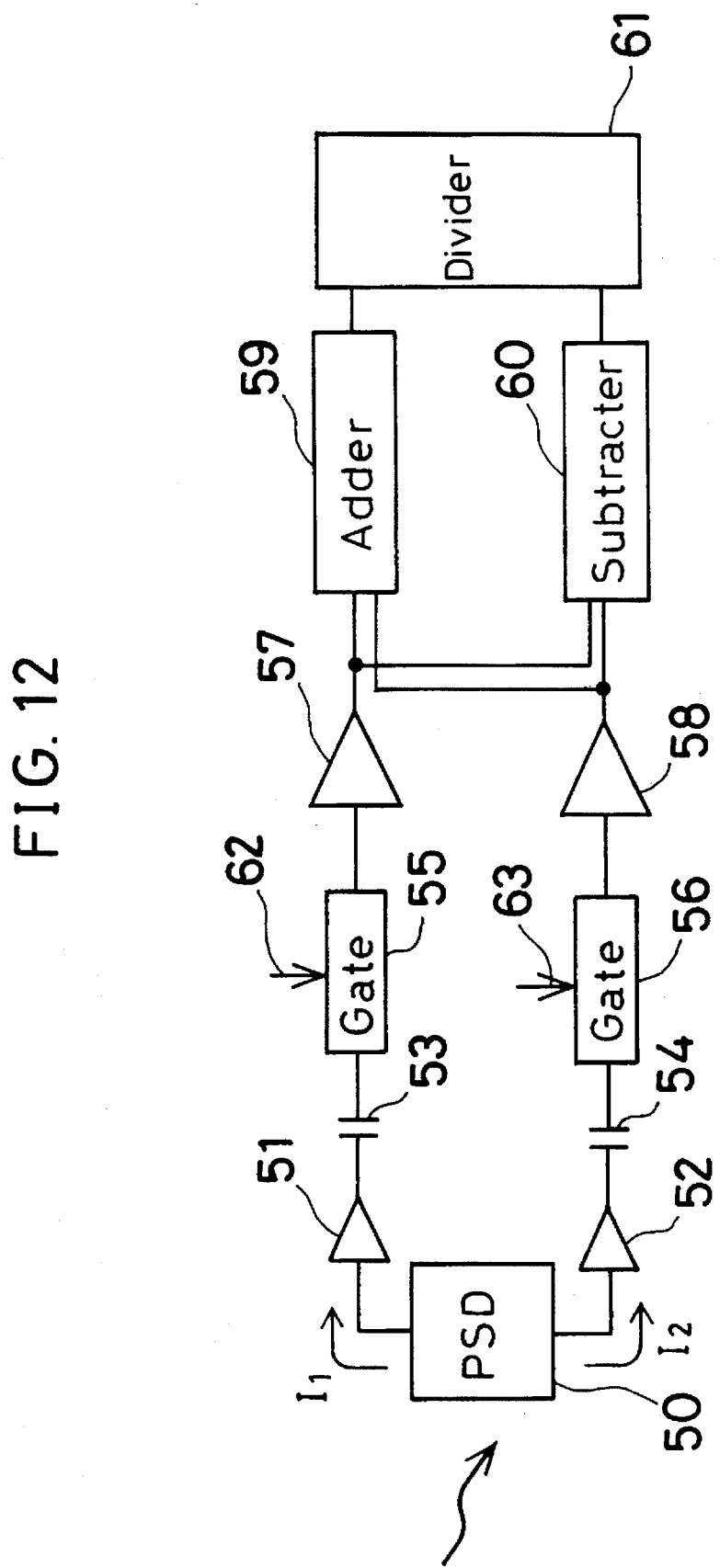
FIG. 12 is a block diagram showing a specific arrangement of a position signal output circuit.

FIG. 12 is a block diagram showing a more specific arrangement of the position signal output circuits 37 and 38 in which a PSD is employed as an imaging device. As illustrated in the figure, the position signal output circuit includes a PSD 50, preamplifiers 51 and 52, coupling capacitors 53 and 54, gate circuits 55 and 56, integrators 57 and 58, an adder 59, a subtracter 60, a divider 61, and gate signals 62 and 63.

Figure 13:
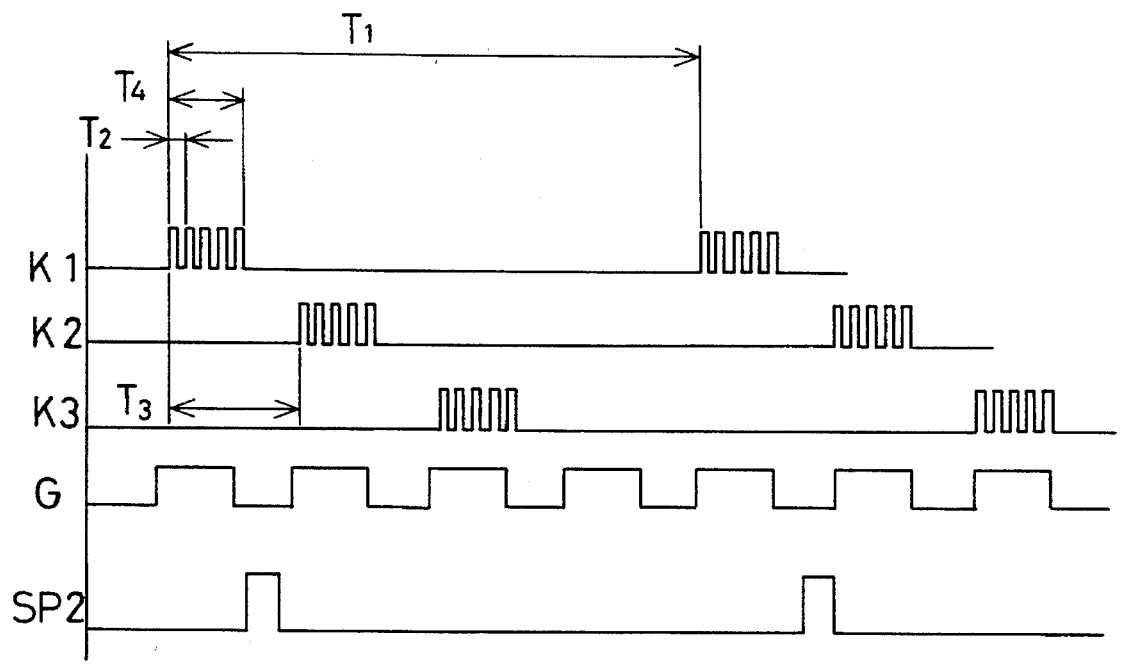
FIG. 13 shows a timing chart.
Figure 14:
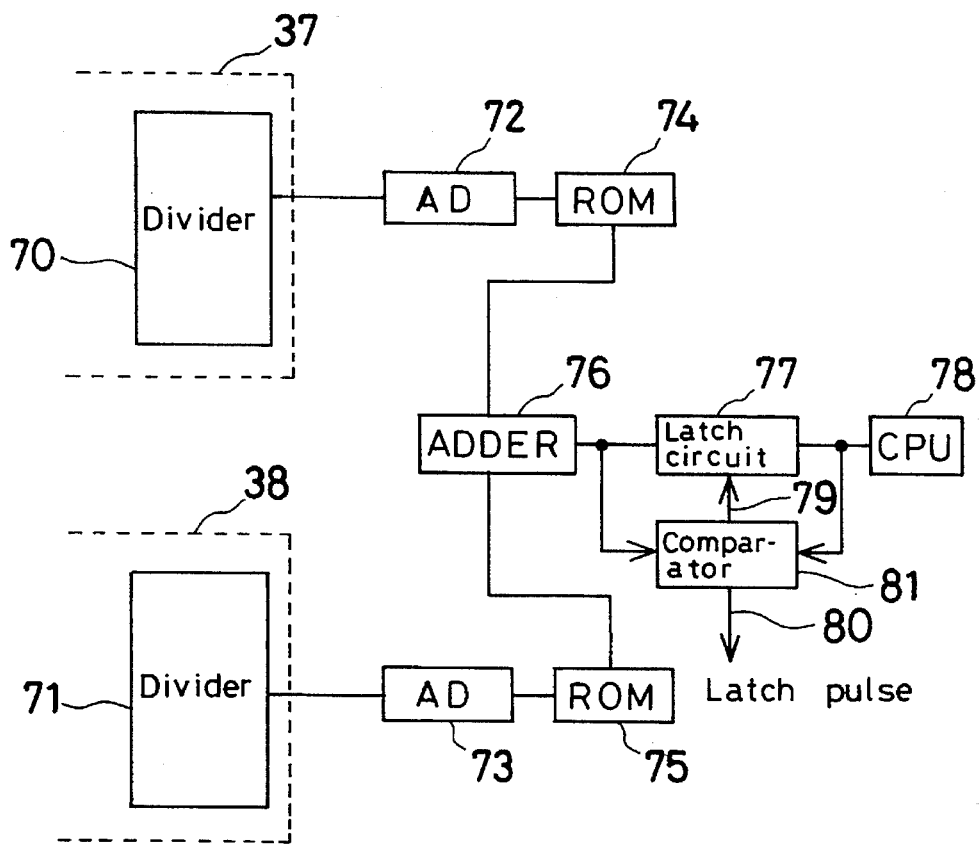
FIG. 14 shows the arrangement of a digital peak value detecting circuit.

FIG. 13 shows a timing chart.

Next, the operation of the signal processing system will be explained with reference to FIGS. 11 to 13. Referring to FIG. 11, the timing circuit 31 generates primitive periods $T_2$, $T_1$ and $T_4$ for generating light source driving pulses $K_i$ (i=1, 2, or 3; here, only three pulses are exemplarily shown for simplification) as shown in waveform $K_1$–$K_3$ in FIG. 13 by using clock pulses supplied from the control circuit 30. The timing circuit 31 further generates a gate pulse G (waveform G in FIG. 13) and a pulse SP2 (waveform SP2 in FIG. 13) indicating one complete sequence. The distributor 32 generates light source driving pulses $K_1$, $K_2$ . . . on the basis of the primitive periods and supplies them to the driver circuit 33. In response to the driving pulses $K_1$, $K_2$. . . , the driver circuit 33 sequentially turns on the light sources 34. Each light source 34 continues to flash in a $T_2$ cycle for a period of time $T_4$ and repeats it in a $T_1$ cycle, as shown in waveform $K_1$–$K_3$ in FIG. 13. The light sources 34 turn on in turn in a time-series manner with a delay of $T_3$.

The gate pulse G, shown in waveform G in FIG. 13, supplies gate signals 62 and 63 that open the gate circuits 55 and 56, shown in FIG. 12, only when a light source 34 is on, thereby minimizing the effect of background light. From point images formed on the imaging devices 35 and 36, shown in FIG. 11, two position signals corresponding to the point images can be obtained by the position signal output circuits 37 and 38. The pulse SP2, which indicates one complete sequence, is used to input data to the control circuit 30.

The operation of the position signal output circuits 37 and 38 will be explained below with reference to FIG. 12. Current values $I_1$ and $I_2$ respectively corresponding to positions on the imaging device PSD are converted into voltages in the preamplifiers 51 and 52 and input to the integrators 57 and 58 through the coupling capacitors 53 and 54 and the gate circuits 55 and 56, respectively. The coupling capacitors 53 and 54 cut off the DC component, and the gate circuits 55 and 56 take in signals in synchronism with the lighting cycle of the light sources, thereby minimizing the effect of background light in the space where the obstacle is present. The integrators 57 and 58 are provided with low-pass characteristics corresponding to the period $T_4$, shown in FIG. 13, thereby averaging position information about the obstacle that is provided by the light sources flashing in a $T_2$ cycle, and thus improving the reliability. The sum of the outputs of the integrators 57 and 58 is calculated in the adder 59, while the difference between the outputs is calculated in the subtracter 60, and the outputs of the adder 59 and the subtracter 60 are input to the divider 61, thereby obtaining a position signal output having a minimal effect of scattered light intensity, as is well known.

Referring to FIG. 11, the output signals from the two position signal output circuits 37 and 38 are subjected to addition and subtraction. Thus, as expressed by the equations (4) and (5), a signal corresponding to 1/Y can be obtained from the adder 39, and a signal corresponding to X can be obtained by inputting the outputs of the adder and subtracter circuits 39 and 40 to the divider 42. From the signal output from the adder 39, a peak value is detected by the peak value detecting circuit 41. Thus, the reciprocal of a minimum value $Y_{im}$ of the distance Y can be obtained by one rotational scanning with light beams, and from time-series data on $1/Y_{im}$ and X thus obtained, the velocity component in the Y-direction and a criterion for judgment of the danger of collision can be obtained by the control circuit 30 in either a software or hardware manner.

A circuit for detecting a peak value from the sum of the outputs of the two position signal output circuits 37 and 38 may be formed as either an analog or digital circuit. A peak value detecting circuit arranged in the form of a digital circuit is shown in the block diagram of FIG. 14. The outputs of dividers 70 and 71, which are at the respective output ends of the position signal output circuits 37 and 38, are converted into digital signals by A/D converters 72 and 73, respectively. The digital signals are associated with non-linear functions written in ROMs 74 and 75, thereby correcting the non-linearity of the measuring system. The outputs of the ROMs 74 and 75 are added together in an adder 76. The output of the adder 76 is latched by a latch circuit 77 and also compared with the preceding latched value in a comparator 81. When the present value is larger than the preceding value, latch pulses 79 and 80 are output to latch a new value corresponding to the reciprocal of the minimum value $Y_{im}$ of the distance signal Y and also latch the corresponding time. The time is obtained by counting clock pulses from a clock built in the control circuit 30 by the operation of a counter (not shown). The latch pulses 79 and 80 are also used to latch values of x1, x2, Δx1 and Δx2 output from the position signal output circuits 37 and 38, shown in FIG. 11, and to input them to the control circuit 30. These values are used to judge whether or not there is a danger of collision.

Next, the feature of this embodiment will be explained. The output of the peak value detecting circuit 41, shown in FIG. 11, corresponds to the reciprocal of the minimum value Yim of the distance Y obtained by one rotational scanning with light beams. From time-series data on the reciprocal of the minimum value $Y_{im}$, the correct value of the Y-direction component of the relative velocity with respect to the obstacle immediately before a collision occurs can be obtained in real time, as described above. In addition, when the value exceeds a predetermined threshold value, a starting signal for life protecting equipment can be generated. By using time-series data simultaneously obtained from the position signal output circuit 37 and 38, it is possible to make a proper judgment as to the danger of collision from the characteristics shown in Tables 1 and 2.

This embodiment may be modified as follows: Although in the arrangement shown in FIG. 10 the light-sending unit 21 is disposed in close proximity to the light-receiving unit 18, it may be disposed at the middle point on the base line AB or at other position. In addition, although in the described embodiment the optical axes of the light-sending and -receiving units 21 and 18 are perpendicular to the base line AB, it should be noted that the present invention is not necessarily limited thereto and that the optical axes of these units 21 and 18 may be inclined with respect to the base line AB.

Figure 15:
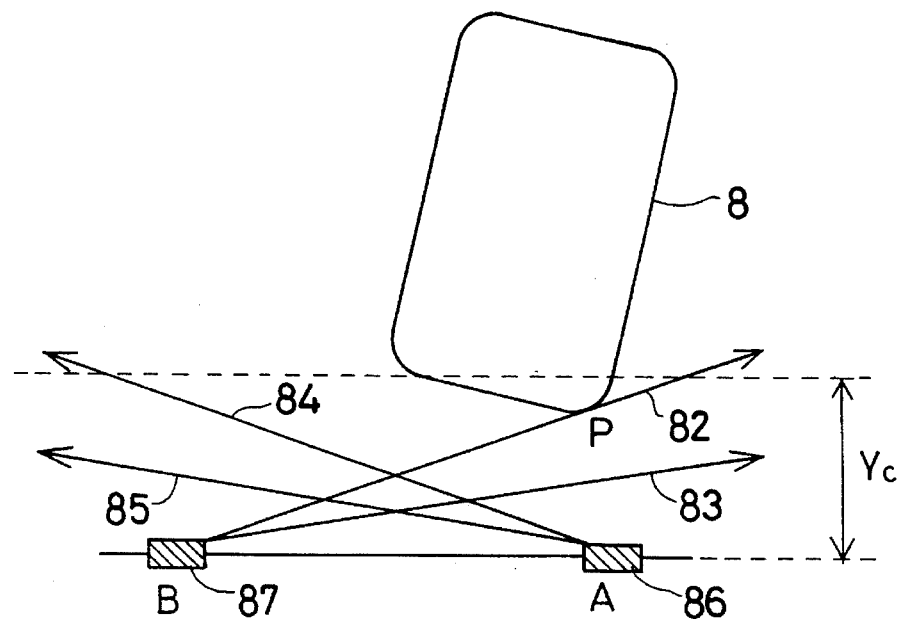
FIG. 15 is a conceptual view of a second embodiment of the present invention.

FIG. 15 shows a second embodiment of the present invention. The second embodiment is basically arranged as follows: Light-sending and -receiving units 86 and 87, each having a pair of light-sending and -receiving parts disposed adjacent to each other, are provided at both ends, respectively, of a base line AB. At least two light beams 82 and 83 (84 and 85) are emitted from each end of the base line AB, thereby obtaining data on the two-dimensional coordinates of a point P at which an obstacle 8 first crosses one of the light beams, together with the time at which it occurs, particularly time-series data on a distance component Y perpendicular to the base line AB. From the data thus obtained, a velocity component perpendicular to the base line AB is obtained.

In the first embodiment, a tangential line parallel to the base line AB is drawn with respect to the obstacle 8, and the movement of the tangential line is measured with the line defined as a feature point of the obstacle 8. In this embodiment, however, a point P of contact between the obstacle 8 and a light beam (82 in the case of the arrangement shown in FIG. 15, which is radially emitted from B) is defined as a feature point, and the movement thereof is measured.

Figure 16:
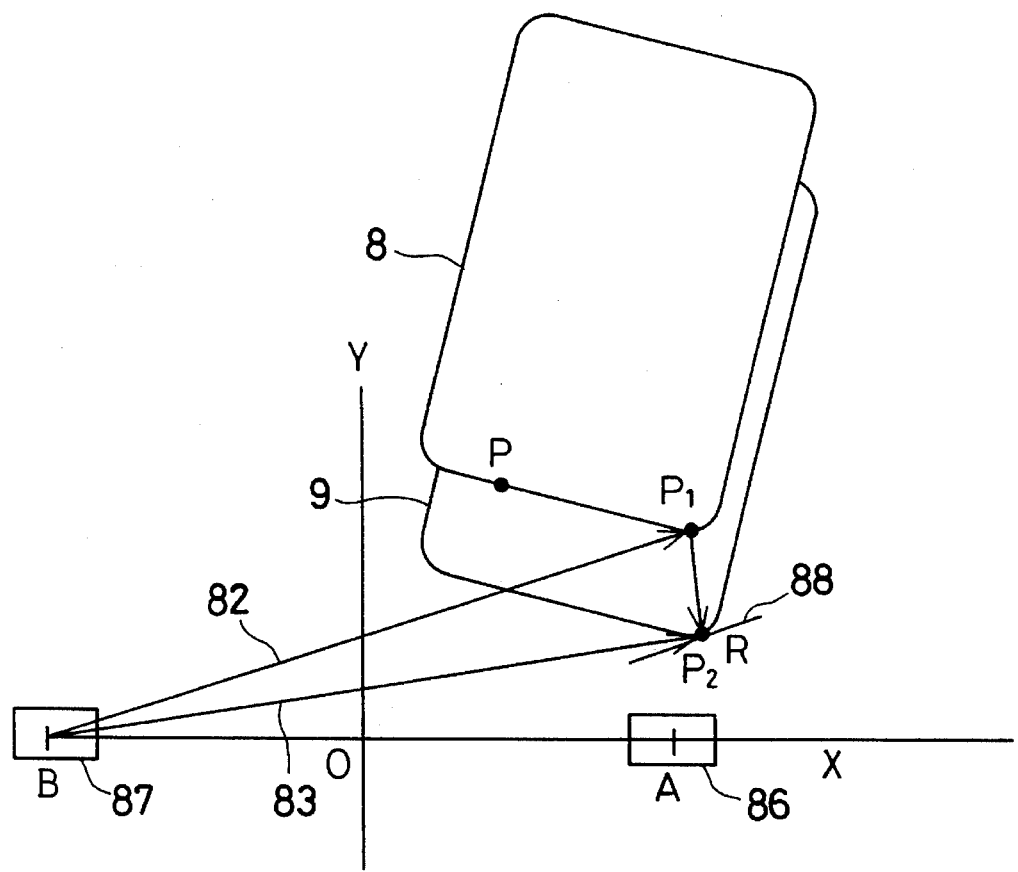
FIG. 16 is a conceptual view of the second embodiment of the present invention.

More specifically, assuming that in FIG. 16, a point at which the obstacle 8 first cuts the light beam 82 is $P_1$, and a point at which the obstacle 8 first cuts the light beam 83 is $P_2$, a displacement vector $P_1P_2$ is obtained. In the meantime, when the obstacle 8 makes parallel displacement, the true displacement vector is given as a vector $P_1R$, where R is a point of contact with a tangential line 88 which is drawn parallel to the light beam 82 with respect to the obstacle 9 after it has moved. Therefore, although the displacement vector $P_1P_2$ is approximate to the true displacement vector $P_1R$, it is practically coincident with the latter. The displacement vector $P_1P_2$ is also practically coincident with the displacement vector $P_{1m}P_{2m}$ in the first embodiment, shown in FIG. 7.

Figure 17:
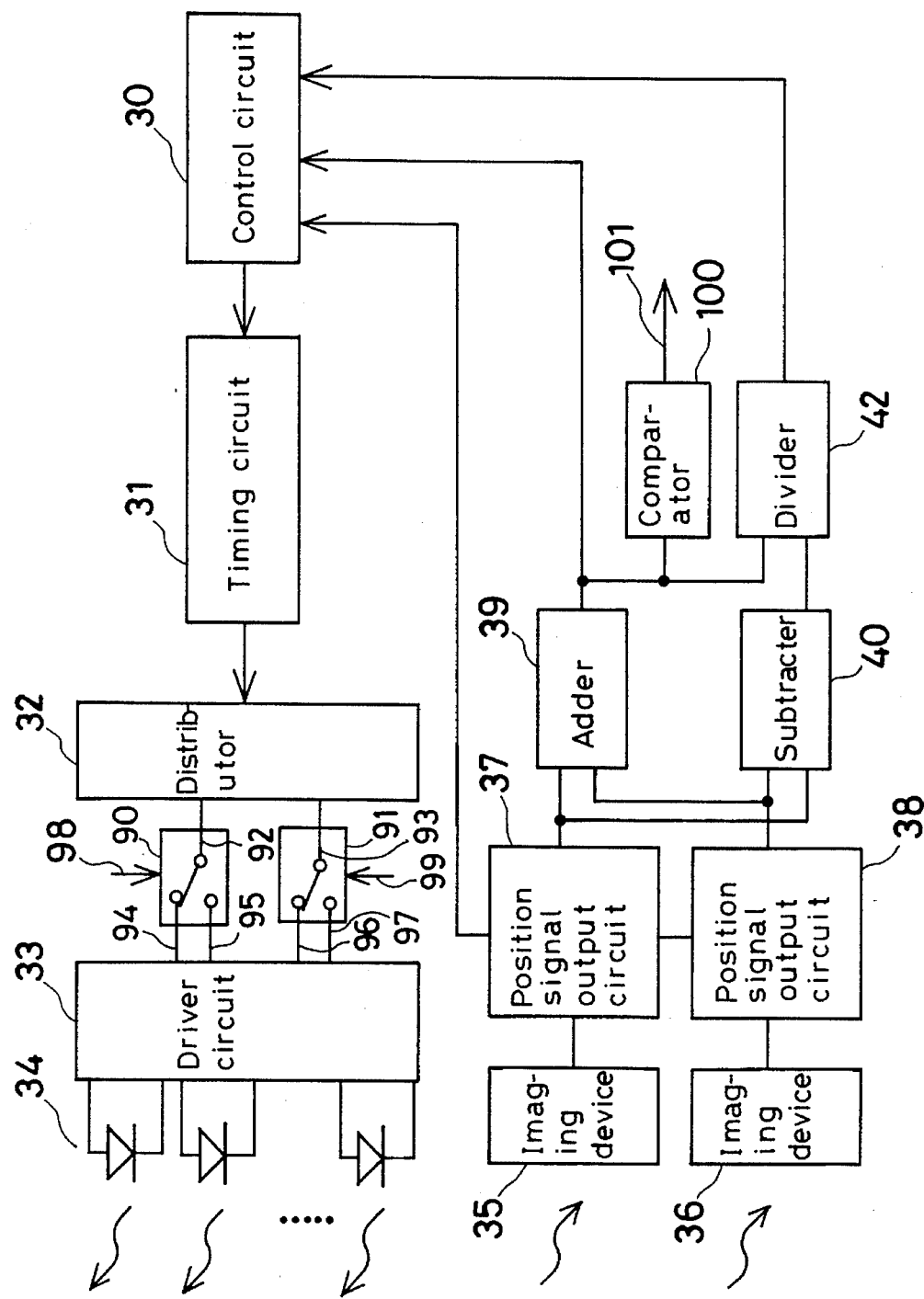
FIG. 17 is a block diagram showing the arrangement of a signal processing system in the second embodiment.

FIG. 17 is a block diagram of a signal processing system in this embodiment, which is formed by modifying a part of the signal processing system shown in FIG. 11. The signal processing system in this embodiment differs from that in the first embodiment in that switching circuits 90 and 91 are provided between the distributor 32 and the driver circuit 33 and that driving signals 98 and 99 for the switching circuits 90 and 91 are formed from an output signal from a comparator 100. In addition, since the peak value detecting circuit 41 as shown in FIG. 11 becomes unnecessary, it is eliminated.

The distributor 32 is adapted to distribute the output signal from the timing circuit 31 to terminals 92 and 93 of the switching circuits 90 and 91 in a time-series manner. The switching circuit 90 connects the terminal 92 to a terminal 94 or 95 under control of the driving signal 98. Similarly, the switching circuit 91 connects the terminal 93 to a terminal 96 or 97 under control of the driving signal 99. The driving signals 98 and 99 are formed by the comparator 100, which will be explained below with reference to FIGS. 17 and 18.

The output signal from the adder 39 in FIG. 17 corresponds to the reciprocal of the position signal Y, as described above. Thus, if the obstacle 8 in FIG. 15 approaches and crosses a light beam, the adder 39 generates a voltage corresponding to the reciprocal of the position signal Y representing a point P at which the obstacle 8 crosses the light beam. In other words, the closer the point P to the base line AB, the higher the voltage generated.

Figure 18:
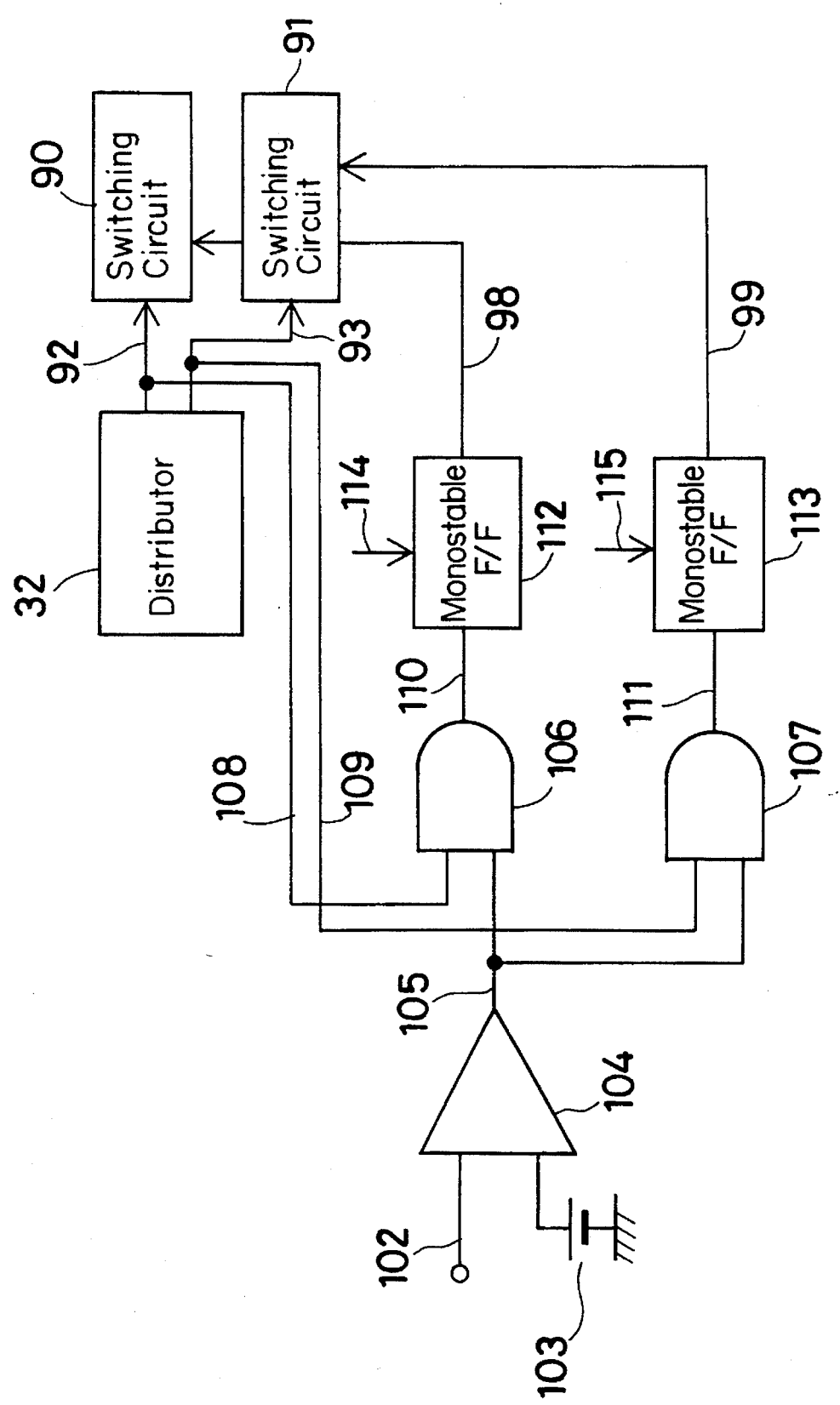
FIG. 18 shows a circuit configuration for changing over light beams.

Referring to FIG. 18, one input terminal 102 of a comparator 104 is fed with the output signal from the adder 39, shown in FIG. 17, and the other input terminal of the comparator 104 is connected to a battery 103 simulatively representing a preset voltage. The voltage of the battery 103 corresponds to a preset distance $Y_C$ from the base line AB in FIG. 15. Accordingly, the fact that the input voltage to the input terminal 102 exceeds the voltage of the battery 103 means that the obstacle 8 has crossed a light beam at a point P closer to the base line AB than the preset distance $Y_C$.

The output of the comparator 104 is input to logic circuits 106 and 107. The other input terminals 108 and 109 of the logic circuits 106 and 107 are supplied with respective signals output from the terminals 92 and 93 of the distributor 32. That is, the output signal from the distributor 32 and the output signal 105 from the comparator 104 are ANDed. In other words, a signal, which represents to which of the terminals 92 and 93 the distributor 32 has distributed the output signal from the timing circuit 31, is ANDed with the output signal from the comparator 104, which represents that the obstacle has come closer than the preset distance $Y_C$, thereby enabling the driving signals 98 and 99 for the switching circuits 90 and 91 to be formed.

More specifically, the logic circuits 106 and 107 are supplied with the output signal 105 from the comparator 104 and the output signal from the distributor 32 through the respective input terminals 108 and 109, and output signals 110 and 111 from the logic circuits 106 and 107 are supplied to monostable flip-flops 112 and 113. Then, output signals 98 and 99 from the flip-flops 112 and 113 are supplied to the switching circuits 90 and 91, respectively. For example, when the terminal 92 is supplied with an ON signal, while the terminal 93 is supplied with an OFF signal, and the output signal 105 from the comparator 104 is ON, only the output signal 110 from the logic circuit 106 is ON, so that the monostable flip-flop 112 alone is ON. Thus, the driving signal 98 is supplied to the switching circuit 90 after a predetermined delay. The delay is needed for inputting time-series data on the distance measurement to the control circuit 30 in FIG. 17. The monostable flip-flops 112 and 113 are reset by reset signals 114 and 115, which are supplied from the control circuit 30 in FIG. 17.

Referring to FIG. 15, the light beams 82, 83, 84 and 85 may be emitted by either of two different methods: In one method, the light beams 82 and 84 are alternately emitted in a time-series manner, and these light beams 82 and 84 are changed over to the light beams 83 and 85 when the obstacle 8 has passed either of the light beams 82 and 84. In the other method, the light beams 82 and 83 are paired with each other, while the light beams 84 and 85 are paired with each other, and the amplitude modulation frequencies of the pairs are made different from each other so that the light beams 82 and 84 are simultaneously emitted. In either of the two methods, signal processing is executed by the circuit shown in the block diagram of FIG. 17. However, in the case of the latter method, the position signal output circuits 37 and 38 need to be modified.

Figure 19:
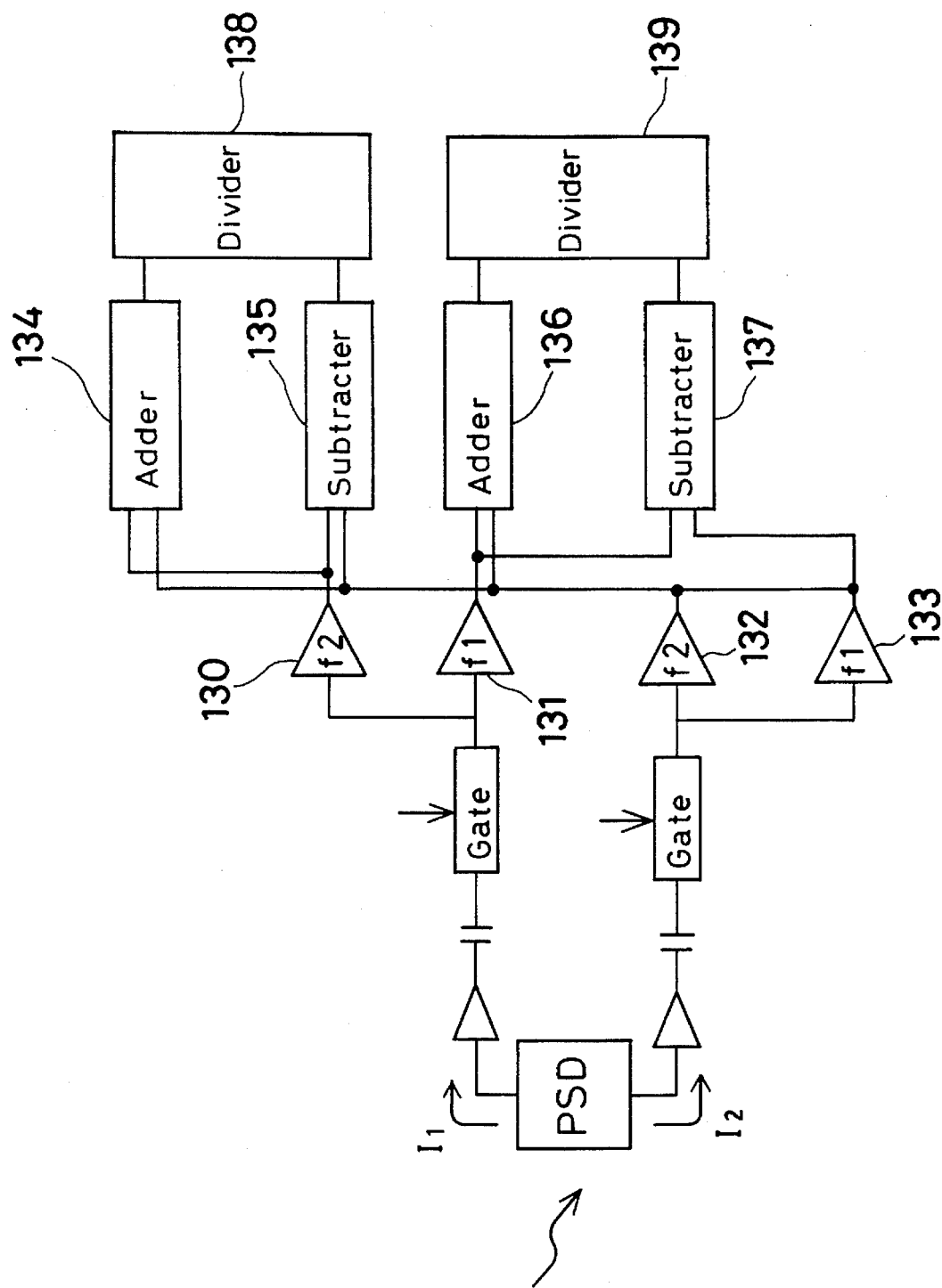
FIG. 19 is a block diagram showing a specific arrangement of a position signal output circuit in a case where the amplitude modulation frequencies of a plurality of light beams are made different from each other.

More specifically, the arrangement shown in the block diagram of FIG. 19 is employed in place of that shown in FIG. 12. Only the part in which the arrangement shown in FIG. 19 differs from that shown in FIG. 12 will be explained below. As shown in FIG. 19, behind the gate circuits, two sets of circuit elements are prepared in correspondence to two different frequencies $f_1$ and $f_2$. That is, behind band-pass filters 130, 131, 132 and 133, two adders 134 and 136, two subtracters 135 and 137, and two dividers 138 and 139 are prepared. The band-pass filters 130, 131, 132 and 133 are each adapted to selectively pass only one of two different amplitude modulation frequencies $f_1$ and $f_2$. That is, the band-pass filters 131 and 133 pass only the amplitude modulation frequency $f_1$, while the band-pass filters 130 and 132 pass only the amplitude modulation frequency $f_2$. Thus even when the light beams 82 and 84 are simultaneously emitted, parallel processing is effectively executed, thereby enabling high-speed processing.

Next, the feature of this embodiment will be explained. In FIG. 15, the light beams 82 and 84 are emitted almost simultaneously to form a barrier of light. Accordingly, it is possible to detect the fact that the obstacle has come closer than the preset distance $Y_C$. Thus, high-speed processing can be executed with a compact arrangement without substantially deteriorating the accuracy of measurement.

The above embodiment may be modified as follows: Although in the arrangement shown in FIG. 15 light beams are radially emitted from both ends of the base line AB, the light beams may be replaced by parallel light beams which are separated at a predetermined distance, as a matter of course.

Figure 20:
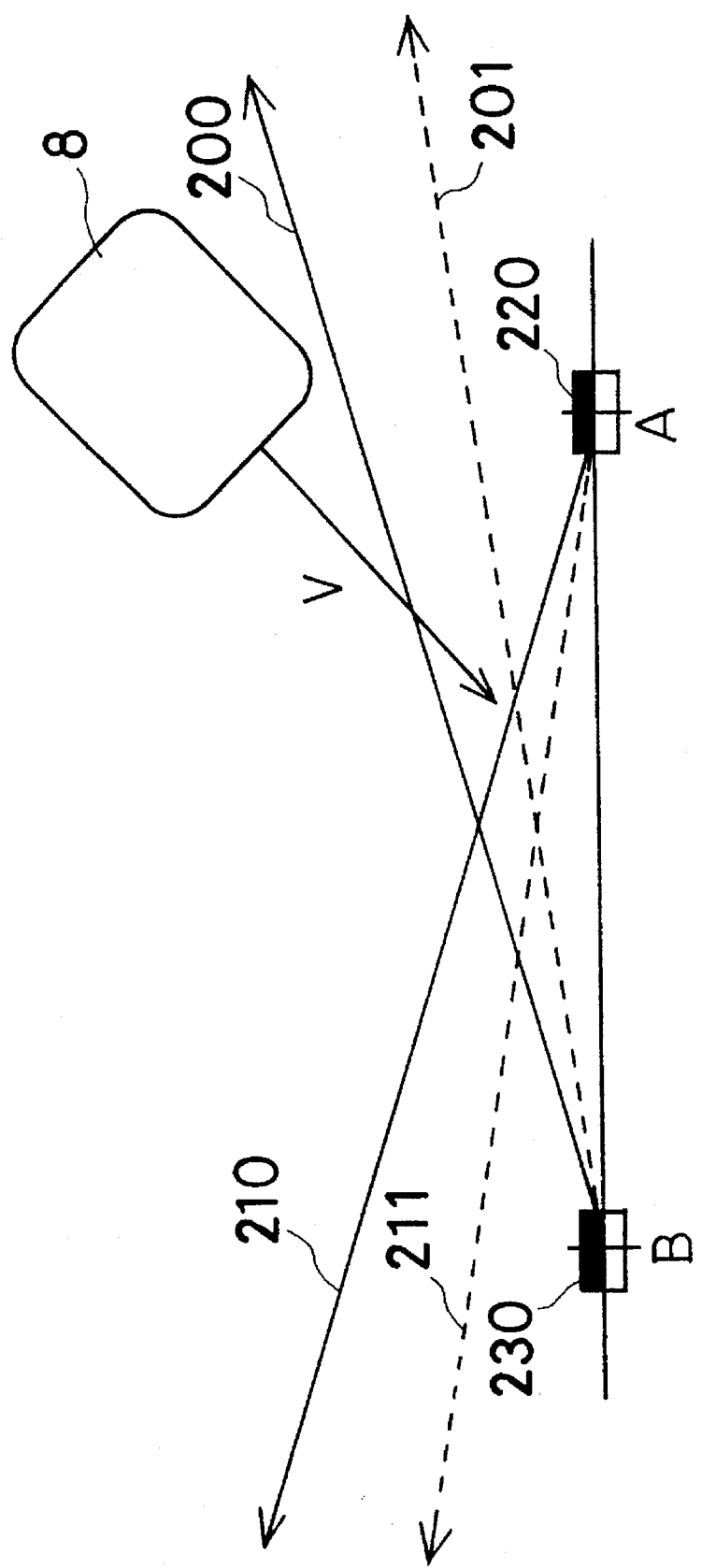
FIG. 20 is conceptual view of a third embodiment of the present invention.

FIG. 20 shows a third embodiment of the present invention. This embodiment is a modification of the arrangement shown in FIG. 15 That is, beams 200, 201, 210 and 211 of a millimeter wave or an ultrasonic wave are disposed in place of the light beams 82, 83, 84 and 85 in FIG. 15. In addition, millimeter or ultrasonic wave-sending and -receiving units 220 and 230 are provided in place of the light-sending and -receiving units 86 and 87 in FIG. 15. When a millimeter wave or an ultrasonic wave is employed, velocity measurement based on the Doppler effect can readily be effected, and it is therefore possible to measure both distance and velocity with only two beams 200 and 210 of a millimeter wave or an ultrasonic wave. However, four beams 200, 201, 210 and 211 of a millimeter wave or an ultrasonic wave can be used in place of the light beams to measure both distance and velocity without employing velocity measurement based on the Doppler effect.

In addition, since the millimeter or ultrasonic wave beams can readily be deflected by electronic scanning, the beams 200, 201, 210 and 211 may be sent as follows: First, only the beams 200 and 210 are sent, and after the obstacle 8 has been detected crossing either of the beams 200 and 210, these beams are deflected so as to serve as the beams 201 and 211, respectively, to stand by for meeting with the obstacle 8. Mechanical scanning may also be employed in place of the electronic scanning, as a matter of course.

As has been described above, it is possible according to the present invention to measure a relative velocity with respect to an obstacle (even an obstacle having significant size) immediately before a collision occurs, particularly a relative velocity component perpendicular to the base line, accurately and in real time with a simple arrangement. When the relative velocity component perpendicular to the base line exceeds a predetermined threshold value, a starting signal for life protecting equipment can be generated. In addition, a danger of collision can also readily be predicted from a measured two-dimensional position signal and time-series data thereon. Accordingly, if the sensor units are attached to the front and side portions of an automobile, for example, as shown in FIG. 21, it is possible to improve the safety of the car during running. The distance-velocity predicting system of the present invention may also be attached to moving objects other than automobiles, as a matter of course. The position where the system is to be attached may be properly selected according to each particular moving object.

What we claim is:

1. A distance-velocity predicting system comprising:
    an illuminator for projecting a light beam for searching for an obstacle;
    a plurality of position sensors spaced at a distance corresponding to a base line length, said plurality of position sensors forming a base line;
    means for determining a closest point on said obstacle approximately closest to said base line;
    means for sampling a shortest distance from said base line to said closest point on said obstacle in a direction perpendicular to said base line by obtaining an amount of said light beam being one of reflected and scattered by said closest point on said obstacle from at least one of said plurality of position sensors and measuring a time between which said shortest distance from said base line to said closest point on said obstacle is sampled; and
    means for obtaining a relative velocity component of said obstacle in a direction perpendicular to said base line from time-series data on said sampled shortest distance from said base line to said closest point on said obstacle.

2. A distance-velocity predicting system according to claim 1, further comprising:
    means for outputting a signal indicating a danger of collision with said obstacle when the following condition is satisfied:

$\Delta x1 \cdot \Delta x2 \leq 0$ wherein $\Delta x1$ and $\Delta x2$ are displacements of a first image in said first position sensor and a second image in said second position sensor, respectively, said first image and said second image being images of said closest point on said obstacle, and said displacements occurring over a predetermined time.

3. A distance-velocity predicting system according to claim 1 or 2, wherein:
    said illuminator includes a plurality of light-emitting elements arranged in a vicinity of a focal point of a projection lens of said illuminator.

4. A distance-velocity predicting system according to claim 1 or 2, wherein:
    said illuminator projects a light beam from each end of said base line so that said light beam from one end of said base line intersects said light beam from the other end of said base line.

5. A distance-velocity predicting system according to claim 4, further comprising:
    means for detecting penetration of said closest point on said obstacle within a predetermined distance from said base line; and
    means for forming a signal for deflecting said light beams from each end of said base line on a basis of an output signal from said means for detecting penetration of said closest point on said obstacle.

6. A distance-velocity predicting system according to claim 1 or 2, further comprising:
    means for distinguishing a degree of danger of collision with said obstacle and for determining a direction of movement of said obstacle with respect to said base line in which said degree of danger of collision with said obstacle is high, from a two-dimensional distance signal obtained from said plurality of position sensors.

7. A distance-velocity predicting system according to claim 1 or 2, wherein:
    said illuminator prospects one of a millimeter wave beam and an ultrasonic wave in place of said light beam for searching for said obstacle.

8. A distance-velocity predicting system according to claim 1 or 2, wherein:
    said illuminator mechanically scans one of a single beam of light, a millimeter wave, and an ultrasonic wave in place of said light beam for searching for said obstacle.

9. A distance-velocity predicting system according to claim 1 or 2, wherein:
    said illuminator electronically scans one of a single beam of a millimeter wave, and an ultrasonic wave in place of said light beam for searching for said obstacle.

10. A distance-velocity predicting system according to claim 2, further comprising:
    means for comparing said relative velocity component with a predetermined threshold value; and
    means for generating a starting signal for life protecting equipment when said relative velocity component exceeds said threshold value.

11. A distance-velocity predicting system comprising:
    an illuminator for projecting a beam for searching for an obstacle;
    a first position sensor;
    a second position sensor spaced from a second position sensor and forming a base line therebetween;
    means for determining a closest point on said obstacle approximately closest to said base line;
    means for sampling a shortest distance from said base line to said closest point on said obstacle in a direction perpendicular to said base line by obtaining an amount of said beam reflected by said closest point on said obstacle from said first position sensor;
    means for measuring times between samples of said means for sampling;
    means for detecting a direction of movement of said obstacle with respect to said base line; and
    means for obtaining a relative velocity component of said obstacle in a direction perpendicular to said base line from said sampled shortest distances and from said measured times.

12. A distance-velocity predicting system according to claim 11, further comprising:

means for outputting a signal indicating a danger of collision with said obstacle when the following condition is satisfied:

$$\Delta x1 \cdot \Delta x2 \leq 0$$

wherein $\Delta x1$ and $\Delta x2$ are displacements of a first image in said first position sensor and a second image in said second position sensor, respectively, said first image and said second image being images of said closest point on said obstacle, and said displacements occurring over a predetermined time.

13. A distance-velocity predicting system according to claim 11, further comprising:

means for detecting penetration of said closest point on said obstacle within a predetermined distance from said base line.

14. A distance-velocity predicting system according to claim 11, further comprising:

means for distinguishing a degree of danger of collision with said obstacle;

said means for determining said direction of movement of said obstacle with respect to said base line including a determination as to said degree of danger of collision with said obstacle.

15. A distance-velocity predicting system according to claim 11, wherein:

said illuminator projects one of a light beam, a millimeter wave beam, and an ultrasonic wave for searching for said obstacle.

16. A distance-velocity predicting system according to claim 11, further comprising:

means for comparing said relative velocity component with a predetermined threshold value; and means for generating a starting signal for life protecting equipment when said relative velocity component exceeds said threshold value.

* * * * *

UNITED STATES PATENT AND TRADEMARK OFFICE
CERTIFICATE OF CORRECTION

PATENT NO.    : 5,504,569
DATED         : April 2, 1996
INVENTOR(S)   : KATO et al.

It is certified that error appears in the above-identified patent and that said Letters Patent is hereby corrected as shown below:

In Column 1, line 52, "canbe" should read --can be--; column 3, line 31, "$K=(V_2-V_1)/(V_1+V_1)$" should read --$K=(V_2-V_1)/(V_2+V_1)$--; column 6, line 65, "$X=(L/2)(\tan\Theta-\tan\phi)/(\tan\Theta-\tan\phi)$" should read --$X=(L/2)(\tan\phi)/(\tan\theta+\tan\phi)$--; column 7, line 49 "$\Delta\Delta 1 \cdot \Delta x2 \leq 0$" should read --$\Delta x1 \cdot \Delta x2 \leq 0$--.

Signed and Sealed this

Twenty-third Day of December, 1997

Attest:

BRUCE LEHMAN

*Attesting Officer*          *Commissioner of Patents and Trademarks*